United States Patent
Ren et al.

(10) Patent No.: US 9,814,061 B2
(45) Date of Patent: Nov. 7, 2017

(54) DATA SCHEDULING METHOD AND DEVICE

(71) Applicant: Huawei Technologies Co., Ltd., Shenzhen, Guangdong (CN)

(72) Inventors: Xiaofeng Ren, Shanghai (CN); Minxi Fang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 143 days.

(21) Appl. No.: 14/812,900

(22) Filed: Jul. 29, 2015

(65) Prior Publication Data
US 2015/0334733 A1  Nov. 19, 2015

Related U.S. Application Data

(63) Continuation of application No. PCT/CN2013/071159, filed on Jan. 30, 2013.

(51) Int. Cl.
*H04W 72/10* (2009.01)
*H04W 72/12* (2009.01)
(Continued)

(52) U.S. Cl.
CPC ...... *H04W 72/1247* (2013.01); *H04B 17/309* (2015.01); *H04L 5/001* (2013.01);
(Continued)

(58) Field of Classification Search
CPC ......... H04W 72/1247; H04W 72/1257; H04W 72/10; H04W 72/1231; H04L 47/722; H04L 5/001; H04B 17/309
See application file for complete search history.

(56) References Cited

U.S. PATENT DOCUMENTS

| | | | |
|---|---|---|---|
| 8,687,555 B2 * | 4/2014 | Ko | H04L 1/0026 370/328 |
| 2007/0070894 A1 * | 3/2007 | Wang | H04W 72/1242 370/230 |

(Continued)

FOREIGN PATENT DOCUMENTS

| | | |
|---|---|---|
| CN | 102238748 A | 11/2011 |
| CN | 102469593 A | 5/2012 |

(Continued)

OTHER PUBLICATIONS

Zhang et al., "Research on carrier resource scheduling based on LTE-Advanced system", Master Dissertation, School of Electronics and Information Engineering, XP008177315, Jun. 1, 2011, 55 pages.

*Primary Examiner* — Phuc Tran

(57) ABSTRACT

Embodiments of the present invention disclose a data scheduling method and a data scheduling device, which is configured to: receive channel quality information sent by a first terminal; calculate a current instantaneous scheduling rate of the first terminal on a first component carrier by using the channel quality information; acquire an average scheduling rate of the first terminal on the first component carrier; calculate a scheduling priority of the first terminal on the first component carrier by using the instantaneous scheduling rate and the average scheduling rate; and allocate a physical resource of the first component carrier to the first terminal. In this way, a multi-carrier terminal is enabled to obtain a stable high rate, differentiation between terminals is achieved.

15 Claims, 8 Drawing Sheets

(51) Int. Cl.
  *H04B 17/309* (2015.01)
  *H04L 12/925* (2013.01)
  *H04L 5/00* (2006.01)
(52) U.S. Cl.
  CPC .......... *H04L 47/722* (2013.01); *H04W 72/10* (2013.01); *H04W 72/1231* (2013.01); *H04W 72/1257* (2013.01)

(56) References Cited

U.S. PATENT DOCUMENTS

| | | | |
|---|---|---|---|
| 2008/0125136 A1* | 5/2008 | Song | H04L 1/0002 455/452.1 |
| 2008/0273493 A1* | 11/2008 | Fong | H04W 72/1252 370/330 |
| 2011/0117949 A1* | 5/2011 | Joko | H04L 1/0007 455/512 |
| 2012/0039199 A1* | 2/2012 | Chen | H04L 1/0027 370/252 |
| 2012/0076028 A1 | 3/2012 | Ko et al. | |
| 2012/0099454 A1 | 4/2012 | Jung et al. | |
| 2012/0320745 A1* | 12/2012 | Shi | H04W 72/1247 370/230 |
| 2015/0029964 A1* | 1/2015 | Seo | H04L 1/0027 370/329 |

FOREIGN PATENT DOCUMENTS

| | | |
|---|---|---|
| CN | 102833786 A | 12/2012 |
| EP | 2 096 895 A2 | 9/2009 |
| JP | 2011142598 A | 7/2011 |
| KR | 20120041899 A | 5/2012 |

* cited by examiner

DATA SCHEDULING METHOD AND DEVICE

CROSS-REFERENCE TO RELATED APPLICATIONS

This application is a continuation of International Application No. PCT/CN2013/071159, filed on Jan. 30, 2013, which is hereby incorporated by reference in its entirety.

TECHNICAL FIELD

The present invention relates to the field of communications technologies, and in particular to a data scheduling method and a data scheduling device.

BACKGROUND

Due to a limited spectrum utilization rate in wireless cellular communications systems, bandwidth occupied by each user is limited, presenting an increasing challenge to meet transmission requirements of high-speed data services. Consequently, an urgent need exists for an approach to provide users with more reliable high-speed data services in wireless broadband mobile networks.

To increase the spectrum utilization rate, the CA (Carrier Aggregation, carrier aggregation) technology is introduced in LTE-A (Long Term Evolution Advanced, Long Term Evolution Advanced). The CA technology utilizes spectrum resources scattered in multiple bands to acquire a wider bandwidth, thereby increasing a peak data rate and a system scheduling rate, and addressing the problem of an operator's spectrum bands being non-contiguous.

Data to be received by a multi-carrier terminal (a terminal using the CA technology, namely, a terminal for which multiple carriers are activated) is received over an air interface of each carrier. A scheme used by the multi-carrier terminal to receive data is as follows: After receiving data from an air interface of each carrier, the multi-carrier terminal assembles the received data into complete final data and then transfers the complete final data to an upper layer of the multi-carrier terminal for use. It is a key technical challenge to obtain an optimal scheduling rate and optimal fairness while maximizing a utilization rate of spectrum resources during data transmission over multiple carriers.

The PF (Proportional Fair, proportional fair) scheduling policy is typically used by data services in wireless communications systems. A basic philosophy of the PF policy is to try to maintain a balance between scheduling rate and fairness. When the carrier aggregation technology is in use, each multi-carrier terminal can send/receive data over multiple component carriers (Component Carrier, CC). However, which carrier is used by a user to send/receive data is transparent to an RLC (Radio Link Control, radio link control) layer.

SUMMARY

In view of this, embodiments of the present invention provide a data scheduling device and a data scheduling device, so that a balance is maintained between terminal differentiation (a high, stable rate is offered to a multi-carrier terminal) and fairness among a multi-carrier terminal and a non-multi-carrier terminal.

A first aspect of the embodiments of the present invention provides a data scheduling method, including:

receiving channel quality information sent by a first terminal, where the first terminal is a terminal for which multiple carriers are activated;

calculating a current instantaneous scheduling rate of the first terminal on a first component carrier by using the channel quality information;

acquiring an average scheduling rate of the first terminal on the first component carrier;

calculating a scheduling priority of the first terminal on the first component carrier by using the instantaneous scheduling rate and the average scheduling rate; and allocating a physical resource of the first component carrier to the first terminal according to a descending order of scheduling priorities of terminals to which a physical resource needs to be allocated, where the terminals to which a physical resource needs to be allocated include the first terminal and a second terminal.

With reference to the implementation of the first aspect, in a first possible implementation, the method further includes:

after allocating a physical resource of the first component carrier to the first terminal, calculating and storing an average scheduling rate of the first terminal on the first component carrier.

With reference to the first aspect or the first possible implementation, in a second possible implementation, the method further includes:

determining that the first component carrier is a primary component carrier or a secondary component carrier of the first terminal; and the allocating a physical resource of the first component carrier to the first terminal according to a descending order of scheduling priorities of terminals to which a physical resource needs to be allocated includes:

if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocating a physical resource of the first component carrier to the first terminal; and if the first component carrier is a primary component carrier of the first terminal and the first component carrier is a secondary component carrier of the second terminal, after allocating a physical resource of the first component carrier to the first terminal, allocating a physical resource of the first component carrier to the second terminal.

With reference to the second possible implementation, in a third possible implementation, the "after determining that the first component carrier is a primary component carrier or a secondary component carrier of the first terminal, if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocating a physical resource of the first component carrier to the first terminal; and if the first component carrier is a primary component carrier of the first terminal and the first component carrier is a secondary component carrier of the second terminal, after allocating a physical resource of the first component carrier to the first terminal, allocating a physical resource of the first component carrier to the second terminal" includes:

if the first component carrier is a primary component carrier of the first terminal, adding the first terminal to a first queue, and if the first component carrier is a secondary component carrier of the first terminal, adding the first terminal to a second queue; and if the first component carrier is a primary component carrier of the second terminal or the second terminal is a non-multi-carrier terminal, adding the second terminal to the first queue, and if the first component carrier is a secondary component carrier of the second terminal, adding the second terminal to the second queue; and first allocating a physical resource of the first component carrier according to a descending order of scheduling priorities of terminals in the first queue, and then allocating a physical resource of the first component carrier according to a descending order of scheduling priorities of terminals in the second queue.

With reference to the first aspect or any one of the first to third possible implementations, in a fourth possible implementation, after the receiving channel quality information sent by a first terminal, the method further includes:

acquiring a current resource utilization rate of the first component carrier; and if the current resource utilization rate of the first component carrier is greater than a first threshold, deactivating scheduling for the first terminal on the first component carrier.

With reference to the fourth possible implementation, in a fifth possible implementation, after the deactivating scheduling for the first multi-carrier terminal on the first component carrier, the method further includes:

acquiring a buffer status of the first terminal; and if the current resource utilization rate of the first component carrier is less than a second threshold and the buffer status of the first terminal is overstocking, activating scheduling for the first terminal on the first component carrier, where the second threshold is less than the first threshold.

An embodiment of the present invention further provides a data scheduling device, including:

a receiving unit, configured to receive channel quality information sent by a first terminal, where the first terminal is a terminal for which multiple carriers are activated;

a rate acquiring unit, configured to acquire an average scheduling rate of the first terminal on a first component carrier;

a calculation unit, configured to calculate a current instantaneous scheduling rate of the first terminal on the first component carrier by using the channel quality information, and calculate a scheduling priority of the first terminal on the first component carrier by using the instantaneous scheduling rate and the average scheduling rate; and a scheduling unit, configured to allocate a physical resource of the first component carrier to the first terminal according to a descending order of scheduling priorities of terminals to which a physical resource needs to be allocated, where the terminals to which a physical resource needs to be allocated include the first terminal and a second terminal.

Optionally, the calculation unit is further configured to calculate an average scheduling rate of the first terminal on the first component carrier after a physical resource of the first component carrier is allocated to the first terminal; and the device further includes: a storage unit, configured to store the average scheduling rate obtained through calculation.

Optionally, the device further includes:

a carrier determining unit, configured to determine that the first component carrier is a primary component carrier or a secondary component carrier of the first terminal, where the scheduling unit is specifically configured to: if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocate a physical resource of the first component carrier to the first terminal; and if the first component carrier is a primary component carrier of the first terminal and the first component carrier is a secondary component carrier of the second terminal, after allocating a physical resource of the first component carrier to the first terminal, allocate a physical resource of the first component carrier to the second terminal.

Optionally, the scheduling unit is specifically configured to: if the first component carrier is a primary component carrier of the first terminal, add the first terminal to a first queue, and if the first component carrier is a secondary component carrier of the first terminal, add the first terminal to a second queue; and if the first component carrier is a primary component carrier of the second terminal or the second terminal is a non-multi-carrier terminal, add the second terminal to the first queue, and if the first component carrier is a secondary component carrier of the second terminal, add the second terminal to the second queue; and first allocate a physical resource of the first component carrier according to a descending order of scheduling priorities of terminals in the first queue, and then allocate a physical resource of the first component carrier according to a descending order of scheduling priorities of terminals in the second queue.

Optionally, the device further includes:

a utilization rate acquiring unit, configured to acquire a current resource utilization rate of the first component carrier after the channel quality information sent by the first terminal is received, where the scheduling unit is further configured to: if the current resource utilization rate of the first component carrier is greater than a first threshold, deactivate scheduling for the first multi-carrier terminal on the first component carrier.

Optionally, the device further includes:

a status acquiring unit, configured to: after scheduling for the first multi-carrier terminal on the first component carrier is deactivated, acquire a buffer status of the first terminal, where the scheduling unit is further configured to: if the current resource utilization rate of the first component carrier is less than a second threshold and the buffer status of the first terminal is overstocking, activate scheduling for the multi-carrier terminal on the first component carrier, where the second threshold is less than the first threshold.

An embodiment of the present invention further provides a data scheduling device, including: a receiver, a transmitter, a processor, and a memory, where:

the receiver is configured to receive channel quality information sent by a first terminal, where the first terminal is a terminal for which multiple carriers are activated; and the processor is configured to: calculate a current instantaneous scheduling rate of the first terminal on a first component carrier by using the channel quality information; acquire an average scheduling rate of the first terminal on the first component carrier; calculate a scheduling priority of the first terminal on the first component carrier by using the instantaneous scheduling rate and the average scheduling rate; and allocate a physical resource of the first component carrier to the first terminal according to a descending order of scheduling priorities of terminals to which a physical resource needs to be allocated, where the terminals to which a physical resource needs to be allocated include the first terminal and a second terminal.

Optionally, the processor is further configured to: after allocating a physical resource of the first component carrier to the first terminal, calculate and store an average scheduling rate of the first terminal on the first component carrier.

Optionally, the processor is further configured to determine that the first component carrier is a primary component carrier or a secondary component carrier of the first terminal; and the allocating a physical resource of the first component carrier to the first terminal according to a descending order of scheduling priorities of terminals to which a physical resource needs to be allocated includes:

if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocating a physical resource of the first component carrier to the first terminal; and if the first component carrier is a primary component carrier of the first terminal and the first component carrier is a secondary component carrier of the second terminal, after allocating a physical resource of the first component carrier to the first terminal, allocating a physical resource of the first component carrier to the second terminal.

Optionally, that "the processor is configured to: after determining that the first component carrier is a primary component carrier or a secondary component carrier of the first terminal, if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocate a physical resource of the first component carrier to the first terminal; and if the first component carrier is a primary component carrier of the first terminal and the first component carrier is a secondary component carrier of the second terminal, after allocating a physical resource of the first component carrier to the first terminal, allocate a physical resource of the first component carrier to the second terminal" includes that: the processor is specifically configured to: if the first component carrier is a primary component carrier of the first terminal, add the first terminal to a first queue, and if the first component carrier is a secondary component carrier of the first terminal, add the first terminal to a second queue; and if the first component carrier is a primary component carrier of the second terminal or the second terminal is a non-multi-carrier terminal, add the second terminal to the first queue, and if the first component carrier is a secondary component carrier of the second terminal, add the second terminal to the second queue; and first allocate a physical resource of the first component carrier according to a descending order of scheduling priorities of terminals in the first queue, and then allocate a physical resource of the first component carrier according to a descending order of scheduling priorities of terminals in the second queue.

Optionally, the processor is further configured to: after the channel quality information sent by the first terminal is received, acquire a current resource utilization rate of the first component carrier; and if the current resource utilization rate of the first component carrier is greater than a first threshold, deactivate scheduling for the first multi-carrier terminal on the first component carrier.

Optionally, the processor is further configured to: after deactivating scheduling for the first multi-carrier terminal on the first component carrier, acquire a buffer status of the first terminal; and if the current resource utilization rate of the first component carrier is less than a second threshold and the buffer status of the first terminal is overstocking, activate scheduling for the multi-carrier terminal on the first component carrier, where the second threshold is less than the first threshold.

It can be seen from above that the foregoing technical solution has the following advantages: on the one hand, a physical resource obtained by a multi-carrier terminal on each component carrier is the same as a physical resource obtained by a non-multi-carrier terminal on the first component carrier; on the other hand, the multi-carrier terminal can use multiple component carriers, and therefore a total amount of physical resources that can be obtained by the multi-carrier terminal can increase stably, indicating that the multi-carrier terminal is obviously advantageous over a non-multi-carrier terminal. In addition, because a scheduling priority of the multi-carrier terminal on each component carrier is separately calculated, the multi-carrier terminal and a non-multi-carrier terminal compete equally for a physical resource on each component carrier. That is to say, during contention for resources on a single component carrier, fairness can still be adequately achieved between the multi-carrier terminal and the non-multi-carrier terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
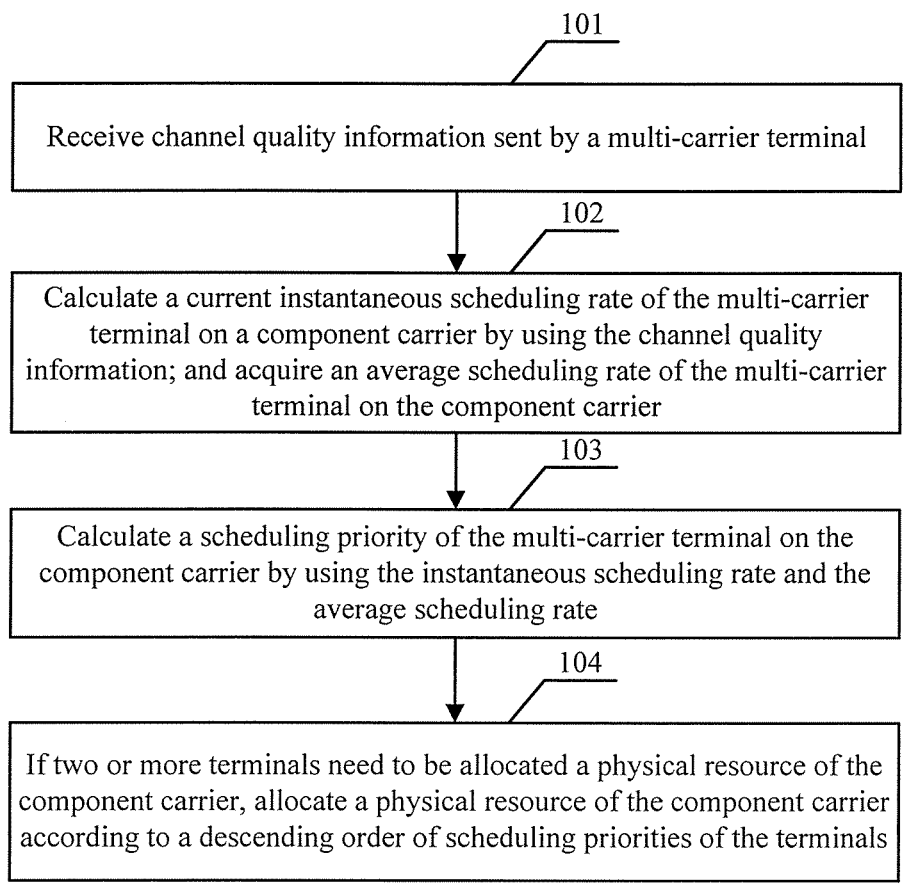
FIG. 1 is a schematic flowchart of a first method according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the prior art, in scheduling resources on each carrier for a multi-carrier terminal, an average scheduling rate used for calculating a scheduling priority is a user-level rate/bearer-level rate, and is equal to a sum of average scheduling rates of the multi-carrier terminal on all component carriers. The scheduling priority of the multi-carrier terminal is calculated using the following formula:

$$\text{Priority}_{CCi} = \frac{R_{CCi}}{\sum_{i=1}^{N} r_{CCi}} \quad \text{(formula 1)}$$

where $\text{Priority}_{CCi}$ refers to the scheduling priority of the multi-carrier terminal on CCi, $R_{CCi}$ refers to a current instantaneous scheduling rate of the multi-carrier terminal on CCi, $r_{CCi}$ refers to an average scheduling rate of the multi-carrier terminal on CCi, and N is the number of component carriers scheduled for the multi-carrier terminal.

The foregoing solution has the following disadvantages:

1. A multi-carrier terminal does not gain a performance advantage over a non-multi-carrier terminal. As seen from the foregoing formula used for calculating a scheduling priority, the denominator is the sum of average scheduling rates of a multi-carrier terminal on all CCs. If all the CCs of the multi-carrier terminal have same or similar channel quality, the scheduling rate of the multi-carrier terminal is the same as that of a non-multi-carrier terminal. In this case, the multi-carrier terminal is not advantageous over a non-multi-carrier terminal. The multi-carrier terminal is unable to obtain a stable high rate for its services, and differentiation between terminals cannot be achieved.

2. Scheduling fairness is relatively poor. As seen from the foregoing formula used for calculating a scheduling priority, the denominator is the sum of average scheduling rates of the multi-carrier terminal on all CCs. If all the CCs of the multi-carrier terminal have same or similar channel quality, the scheduling rate of the multi-carrier terminal is the same as that of a non-multi-carrier terminal, scheduling priorities may gradually achieve a same value, thereby achieving relatively good fairness. However, if the channel quality of the multi-carrier terminal is quite different on different CCs, a value that is gradually achieved for the scheduling priorities of the multi-carrier terminal becomes unpredictable, thereby compromising the fairness. The fairness is further affected by the fact that CCs have different bandwidths and different quantities of access users.

An embodiment of the present invention provides a data scheduling method. As shown in FIG. 1, the method includes:

101: Receive channel quality information sent by a multi-carrier terminal.

The channel quality information of the terminal changes in real time; therefore, in a data scheduling scheme, step 101 may be performed periodically, and subsequent steps may be repeated together with step 101.

102: Calculate a current instantaneous scheduling rate of the multi-carrier terminal on a component carrier by using the channel quality information; and acquire an average scheduling rate of the multi-carrier terminal on the first component carrier.

The average scheduling rate in this step refers to the average scheduling rate obtained by the multi-carrier terminal on the first component carrier. For example, a calculation method is to divide a total amount of data transferred by the multi-carrier terminal on the first component carrier by an amount of time for which the component carrier is occupied by the multi-carrier terminal.

103: Calculate a scheduling priority of the multi-carrier terminal on the first component carrier by using the instantaneous scheduling rate and the average scheduling rate.

Steps 101 to 103 can be executed for both a multi-carrier terminal and a non-multi-carrier terminal to obtain a respective scheduling priority. The following provides an example in which it is assumed that a larger scheduling priority value indicates a higher priority, as shown in Table 1.

TABLE 1

| Terminal Identity | Terminal Type | Scheduling Priority |
|---|---|---|
| CA123 | Multi-carrier terminal | 10 |
| CA124 | Multi-carrier terminal | 11 |
| NCA223 | Non-multi-carrier terminal | 13 |
| NCA224 | Non-multi-carrier terminal | 9 |
| NCA225 | Non-multi-carrier terminal | 8 |

104: If two or more terminals need to be allocated a physical resource of the component carrier, allocate a physical resource of the component carrier according to a descending order of scheduling priorities of the terminals.

The physical resource may be an air interface resource, a data channel resource, and the like. A specific resource type is not limited in this embodiment of the present invention. The method of this embodiment may be executed by a device that allocates a physical resource of a component carrier in a multi-carrier technology. For example, it may be an eNB (evolved Node B, evolved Node B) in LTE, or an RNC (Radio Network Controller, radio network controller) in WCDMA (Wideband Code Division Multiple Access, Wideband Code Division Multiple Access). It should be understood that many types of devices are capable of allocating a physical resource of a component carrier in a multi-carrier technology, and it is impossible to list all of them in an exhaustive fashion; therefore, the foregoing example should not be construed as a limitation on this embodiment of the present invention.

As an example, referring to Table 1, it can be determined in step 104 that five terminals need to be allocated a physical resource of a component carrier. The scheduling priorities in Table 1 are not presented in an order. In fact, implementation of this embodiment is not affected, regardless of whether or not the scheduling priorities are in an order.

A solution used to allocate a physical resource can be specifically as follows: First, a terminal with a highest scheduling priority 13, namely, the terminal whose terminal identity is NCA223, is selected; a physical resource is first allocated to this terminal; then, if the component carrier still has available physical resource after the resource allocation to this terminal, a physical resource is allocated to a terminal with a second highest priority 11, namely, the terminal whose terminal identity is CA123; and in a same manner, a physical resource is allocated to terminals with a third, fourth, and fifth scheduling priorities in sequence. It can be understood that subsequent terminals may not be allocated a physical resource due to limited physical resources. It can also be understood that if only one terminal needs to be allocated a physical resource of the component carrier, a physical resource of the component carrier can be directly allocated to the one terminal without considering scheduling priorities.

In this solution, on the one hand, a multi-carrier terminal and a non-multi-carrier terminal contend in a fair manner for physical resources on each component carrier; on the other hand, a multi-carrier terminal can use multiple component carriers, and therefore a total amount of physical resources that can be obtained by a multi-carrier terminal can increase stably, indicating that the multi-carrier terminal is obviously advantageous over the non-multi-carrier terminal. In this way, the technical solution according to this embodiment of the present invention achieves differentiation between terminals.

In addition, because a scheduling priority of a multi-carrier terminal on each component carrier is separately calculated, a multi-carrier terminal and a non-multi-carrier terminal compete equally for a physical resource on each component carrier. That is to say, during contention for resources on a single component carrier, fairness can still be adequately achieved between a multi-carrier terminal and a non-multi-carrier terminal.

Further, this embodiment of the present invention further provides an alternative solution for acquiring an average scheduling rate: After a physical resource of the component carrier is allocated according to a descending order of the scheduling priorities of the terminals, an average scheduling rate of the terminals on the first component carrier is calculated, and the calculated average scheduling rate is stored. It can be understood that, if the average scheduling rate is already stored, the average scheduling rate of the multi-carrier terminal on the first component carrier can be read directly in step 102 when this method is executed again.

In an entire wireless communications system, when this solution is employed, physical resources occupied by a multi-carrier terminal may be several times more than physical resources occupied by a non-multi-carrier terminal, and a multi-carrier terminal may occupy so many physical resources that few physical resources are available for use by a non-multi-carrier terminal. This embodiment of the present invention further provides a solution to strike a balance between putting a multi-carrier terminal in an advantageous position in the physical resource allocation process and ensuring availability of physical resources for a non-multi-carrier terminal. Specifically, the method further includes:

determining that the component carrier is a primary component carrier or a secondary component carrier of the multi-carrier terminal; and organizing the scheduling priorities of the two or more terminals in descending order, where the organizing the scheduling priorities of the two or more terminals in descending order includes:

if the component carrier is a primary component carrier of the multi-carrier terminal, adding the multi-carrier terminal to a first queue, where the first queue includes scheduling priorities of any quantity of non-multi-carrier terminals or other multi-carrier terminals; and organizing the scheduling priorities in the first queue in an order; or if the component carrier is a secondary component carrier of the multi-carrier terminal, adding the scheduling priority of the multi-carrier terminal to a second queue, where the second queue includes scheduling priorities of any quantity of multi-carrier terminals; and organizing the scheduling priorities in the second queue in an order;

then, in step 104 of allocating a physical resource of the component carrier according to a descending order of scheduling priorities of the terminals includes:

allocating a physical resource of the component carrier according to a descending order of scheduling priorities of terminals in the first queue, and then allocating a physical resource of the component carrier according to a descending order of scheduling priorities of terminals in the second queue.

Compared with the embodiment corresponding to FIG. 1, this embodiment introduces the step of determining a type of the component carrier of a multi-carrier terminal. For a multi-carrier terminal and a non-multi-carrier terminal, their corresponding scheduling priorities can still be obtained by practicing the method in steps 101 to 103. In the following example, a non-multi-carrier terminal corresponds to only one carrier, and consequently its carrier type can be empty, as shown in Table 2.

TABLE 2

| Terminal Identity | Terminal Type | Carrier Type | Scheduling Priority |
|---|---|---|---|
| CA123 | Multi-carrier terminal | Primary component carrier | 10 |
| CA124 | Multi-carrier terminal | Secondary component carrier | 11 |
| CA125 | Multi-carrier terminal | Primary component carrier | 14 |
| CA126 | Multi-carrier terminal | Secondary component carrier | 16 |
| NCA223 | Non-multi-carrier terminal | — | 13 |
| NCA224 | Non-multi-carrier terminal | — | 9 |
| NCA225 | Non-multi-carrier terminal | — | 8 |

As explained in the foregoing description of this embodiment, the terminals in Table 2 can be organized into two groups and within each group, scheduling priorities of the terminals are arranged in an order, as shown in Table 3 and Table 4. In Table 3 and Table 4, the scheduling priorities are organized in descending order. The implementation of this embodiment of the present invention is not affected if the scheduling priorities are organized in ascending order. Table 3 corresponds to the first queue, and Table 4 corresponds to the second queue.

TABLE 3

| Terminal Identity | Terminal Type | Carrier Type | Scheduling Priority |
|---|---|---|---|
| CA125 | Multi-carrier terminal | Primary component carrier | 14 |
| NCA223 | Non-multi-carrier terminal | — | 13 |
| CA123 | Multi-carrier terminal | Primary component carrier | 10 |

TABLE 3-continued

| Terminal Identity | Terminal Type | Carrier Type | Scheduling Priority |
|---|---|---|---|
| NCA224 | Non-multi-carrier terminal | — | 9 |
| NCA225 | Non-multi-carrier terminal | — | 8 |

TABLE 4

| Terminal Identity | Terminal Type | Carrier Type | Scheduling Priority |
|---|---|---|---|
| CA126 | Multi-carrier terminal | Secondary component carrier | 16 |
| CA124 | Multi-carrier terminal | Secondary component carrier | 11 |

Based on Table 3 and Table 4, in the solution according to this embodiment, the terminals in Table 3 are first allocated physical resources; for an allocation scheme, refer to the allocation scheme corresponding to Table 1, and details are not repeated herein again. After all the terminals in Table 3 are allocated physical resources, the terminals in Table 4 are allocated physical resources; for an allocation scheme, refer to the allocation scheme corresponding to Table 1, and details are not repeated herein again.

According to the solution in this embodiment, the process of determining whether a CA terminal (multi-carrier terminal) has a chance to obtain a physical resource on an individual component carrier is as follows: After a Non-CA (Non Carrier Aggregation, non carrier aggregation) terminal and a CA PCC (Primary Component Carrier, primary component carrier) terminal (the component carrier is a primary component carrier of the multi-carrier terminal) on the first component carrier are allocated physical resources, if there is still physical resource available for use, a CA SCC terminal (the component carrier is a secondary component carrier of the multi-carrier terminal) is able to obtain a physical resource; if there is no physical resource available for use, the CA SCC terminal is unable to obtain a physical resource. In this solution, a multi-carrier terminal can compete equally with a Non-multi-carrier terminal for a physical resource on a primary component carrier of the multi-carrier terminal; however, the multi-carrier terminal needs to wait for a chance to obtain a physical resource on a secondary component carrier of the multi-carrier terminal until a non-multi-carrier terminal and the CA PCC (Primary Component Carrier, primary component carrier) terminal obtain a physical resource. In this way, a multi-carrier terminal can still obtain more physical resources than a non-multi-carrier terminal, without having to take away too many physical resources from a non-multi-carrier terminal. This maintains a balance between user differentiation and fairness.

In the solution that uses formula 1 as a basis for data scheduling, the following problem may exist: An overall scheduling rate of a wireless communications system may not always increase stably. This is because a multi-carrier terminal uses multiple component carriers, and the multiple component carriers include one PCC (Primary Component Carrier, primary component carrier) and at least one SCC (Secondary Component Carrier, secondary component carrier). Returning to formula 1 in this embodiment, it is assumed that CC1 is a primary component carrier and CC2 to CCi are secondary component carriers. If the multi-carrier terminal attempts to preempt a resource on the secondary component carriers from a non-multi-carrier terminal when there is only a few of or even no idle data channel resource on the secondary component carriers, the attempt may fail and become nothing more than a waste of control channel resources, thereby degrading overall performance of the wireless communications system.

To resolve the foregoing technical problem, this embodiment of the present invention further provides the following technical solution. After the receiving channel quality information sent by a multi-carrier terminal, the method further includes: acquiring a current resource utilization rate of the component carrier; and if the current resource utilization rate of the component carrier is greater than a first threshold, deactivating scheduling for the first terminal on the first component carrier. The first threshold is used to determine the likelihood that the component carrier has no physical resource available for allocation to a CA SCC terminal. If the threshold is set to a large value, the CA SCC terminal has a greater chance to obtain a physical resource. If the threshold is set to a smaller value, physical resource demands of a CA PCC terminal and a non-multi-carrier terminal can be better met. A specific value set for the first threshold is not limited in this embodiment of the present invention. This solution can prevent a performance loss brought by the multi-carrier terminal when a resource utilization rate of the entire network is quite high, thereby increasing the overall performance of the entire wireless communications network.

Further, this embodiment of the present invention further provides a solution for activating scheduling for the first terminal on the first component carrier. The foregoing method further includes: acquiring a buffer status of the multi-carrier terminal; if the current resource utilization rate of the component carrier is less than a second threshold and the buffer status of the terminal is overstocking, activating scheduling for the first terminal on the first component carrier, where the second threshold is less than the first threshold; otherwise, retaining a state of the scheduling for the first terminal on the first component carrier. The second threshold is used to determine when a CA SCC terminal can be allocated a physical resource. If the threshold is set to a large value, it is favorable for the CA SCC terminal to be allocated a physical resource. If the threshold is set to a smaller value, physical resource demands of a CA PCC terminal and a non-multi-carrier terminal can be better met. A specific value set for the second threshold is not limited in this embodiment of the present invention.

In the solution according to this embodiment, scheduling for a multi-carrier terminal on its secondary component carrier can be reactivated in a case in which sufficient resources are available on the first component carrier and the multi-carrier terminal has a large amount of data to send. In this way, the multi-carrier terminal can obtain more physical resources when sufficient physical resources of component carriers are available.

Figure 2A:
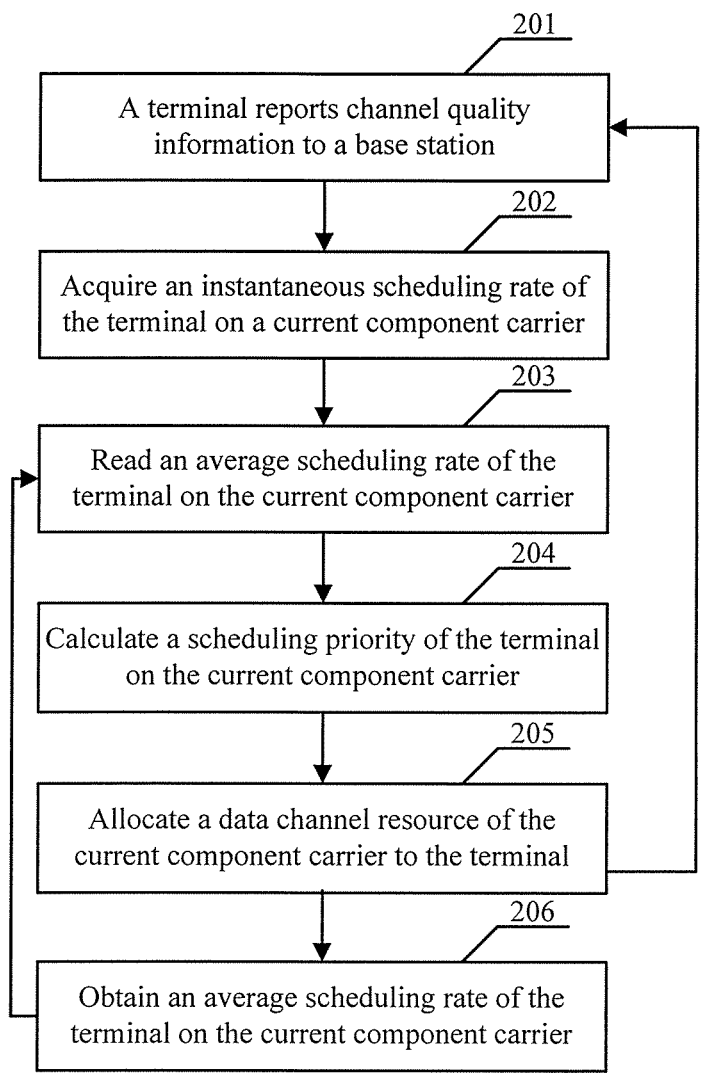
FIG. 2A is a schematic flowchart of a second method according to an embodiment of the present invention.

Based on the foregoing embodiment, an embodiment of the present invention provides a more detailed example for description. In the example provided in this embodiment, a base station allocates a data channel resource to a component carrier. Referring to FIG. 2, the method includes:

201: A terminal reports channel quality information to a base station.

202: The base station obtains spectrum efficiency of a current component carrier based on the received channel quality information, to acquire an instantaneous scheduling rate of the terminal on the current component carrier, where it is assumed that the instantaneous scheduling rate is $R_{CCi}$ and the current component carrier is CCi.

203: The base station acquires an average scheduling rate of the terminal on the current component carrier, where it is assumed that the average scheduling rate is $r_{CCi}$.

204: The base station calculates a scheduling priority of the terminal on the current component carrier.

For the specific calculation, refer to the following:

$$\text{Priority}_{CCi} = \frac{R_{CCi}}{r_{CCi}}.$$

After steps 201 to 204 are performed for multiple terminals, it may be learned that multiple terminals desire to be allocated a data channel resource of the component carrier, where the multiple terminals may include a multi-carrier terminal, and may also include a non-multi-carrier terminal; and the scheduling priority of each terminal is obtained. Table 1 presents an example of the scheduling priority of each terminal.

The foregoing steps 201 to 204 are applicable to calculation of a scheduling priority of both a multi-carrier terminal and a non-multi-carrier terminal.

205: The base station allocates data channel resources of the current component carrier to the terminals according to a descending order of the scheduling priorities. Then, the method process may return to step 201.

For a specific allocation process in this step, refer to the process of allocating resources to terminals in Table 1.

206: For each of the terminals that are allocated a data channel resource, the base station calculates data volume transferred on the current component carrier by the terminal, and divides a sum of the data volume and historical data volume on this component carrier by an amount of time for which the data channel resource is occupied by the terminal, to obtain an average scheduling rate of the terminal on the current component carrier. The average scheduling rate calculated in step 206 could be used as the result of step 203 in the next process.

In this solution, on the one hand, a multi-carrier terminal and a non-multi-carrier terminal contend in a fair manner for physical resources on each component carrier; on the other hand, a multi-carrier terminal can use multiple component carriers, and therefore a total amount of physical resources that can be obtained by the multi-carrier terminal can increase stably, indicating that the multi-carrier terminal is obviously advantageous over a non-multi-carrier terminal. In this way, differentiation between terminals is achieved.

In addition, because a scheduling priority of a multi-carrier terminal on each component carrier is separately calculated, the multi-carrier terminal and a non-multi-carrier terminal compete equally for a physical resource on each component carrier. That is to say, during contention for resources on a single component carrier, fairness can still be adequately achieved between the multi-carrier terminal and the non-multi-carrier terminal.

Figure 2B:
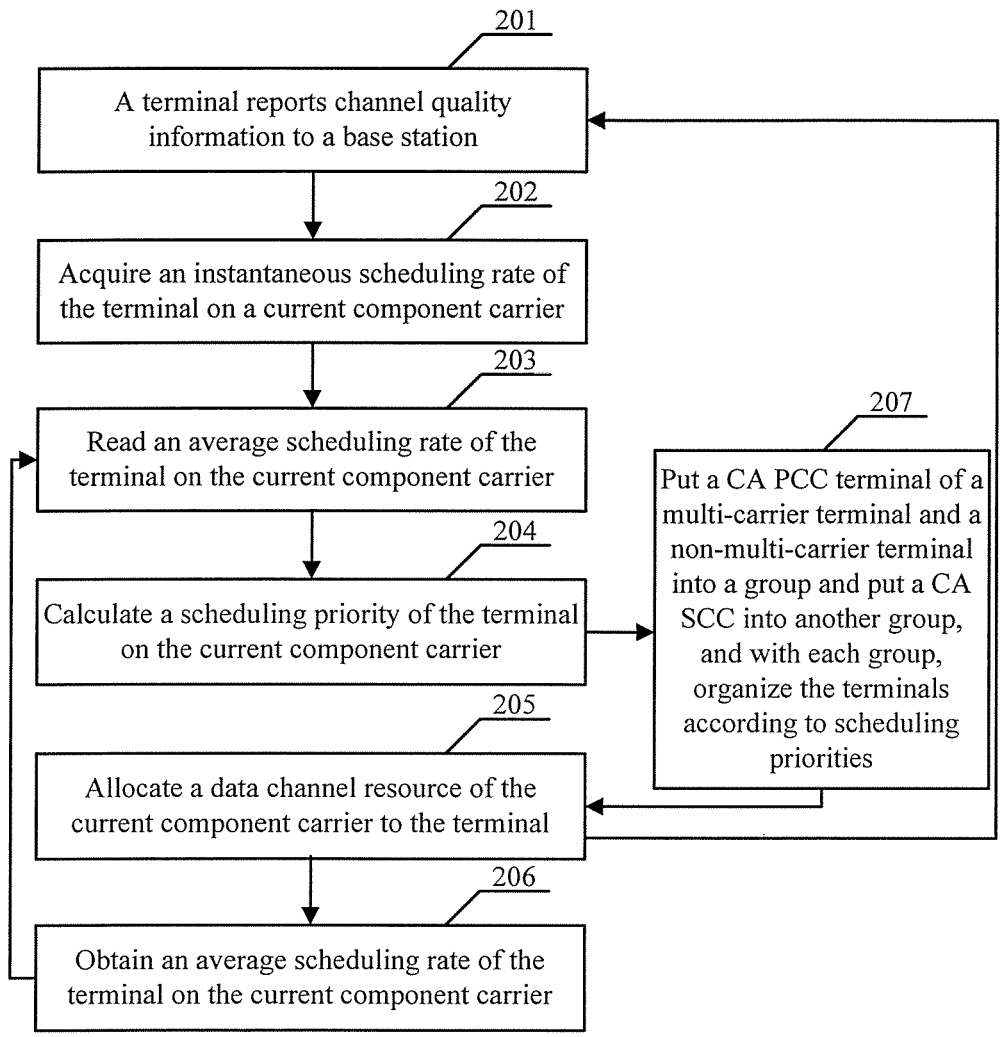
FIG. 2B is a schematic flowchart of a third method according to an embodiment of the present invention.

In an entire wireless communications system, when the solution corresponding to FIG. 2 is employed, physical resources occupied by a multi-carrier terminal may be several times more than physical resources occupied by a non-multi-carrier terminal, and a multi-carrier terminal may occupy so many physical resources few physical resources are available for use by a non-multi-carrier terminal. This embodiment of the present invention further provides a solution to strike a balance between putting a multi-carrier terminal in an advantageous position in the physical resource allocation process and ensuring availability of physical resources for a non-multi-carrier terminal. Specifically, the method may further include:

determining whether the component carrier is a primary component carrier or a secondary component carrier of the multi-carrier terminal; and organizing the scheduling priorities of the two or more terminals in descending order. Referring to FIG. 2B, the following step may be added between step 204 and step 205.

207: Put a CA PCC terminal of the multi-carrier terminal and a non-multi-carrier terminal into a group and put a CA SCC terminal into another group, and within each group, organize the terminals according to scheduling priorities. For a specific example of the grouping, refer to Table 2 to Table 4. Then in step 205, the base station first allocates a data channel resource of the current component carrier to terminals in the first group according to a descending order of the scheduling priorities; and then allocates a data channel resource of the current component carrier to a terminal in the second group according to a descending order of the scheduling priorities. For a specific allocation process, refer to the process of allocating physical resources to the terminals in Table 3 and Table 4. Other steps are the same as those in the foregoing embodiment, are not described herein again.

When the solution according to this embodiment is employed, the process of determining whether a multi-carrier terminal has a chance to obtain a physical resource on an individual component carrier is as follows: After a Non-CA (Non Carrier Aggregation, non carrier aggregation) terminal and a CA PCC terminal (the component carrier is a primary component carrier of the multi-carrier terminal) on the first component carrier are allocated a physical resource, if there is still physical resource available for use, a CA SCC terminal the component carrier is a secondary component carrier of the multi-carrier terminal) is able to obtain a physical resource; if there is no physical resource available for use, the CA SCC terminal is unable to obtain a physical resource. In this solution, a multi-carrier terminal can compete equally with a non-multi-carrier terminal for a physical resource on a primary component carrier of the multi-carrier terminal; however, the multi-carrier terminal needs to wait for a chance to obtain a physical resource on a secondary component carrier of the multi-carrier terminal until a non-multi-carrier terminal and the CA PCC terminal obtain a physical resource. In this way, a multi-carrier terminal can still obtain more physical resources than a non-multi-carrier terminal, without having to take away too many physical resources from a non-multi-carrier terminal. This maintains a balance between user differentiation and fairness.

Figure 3:
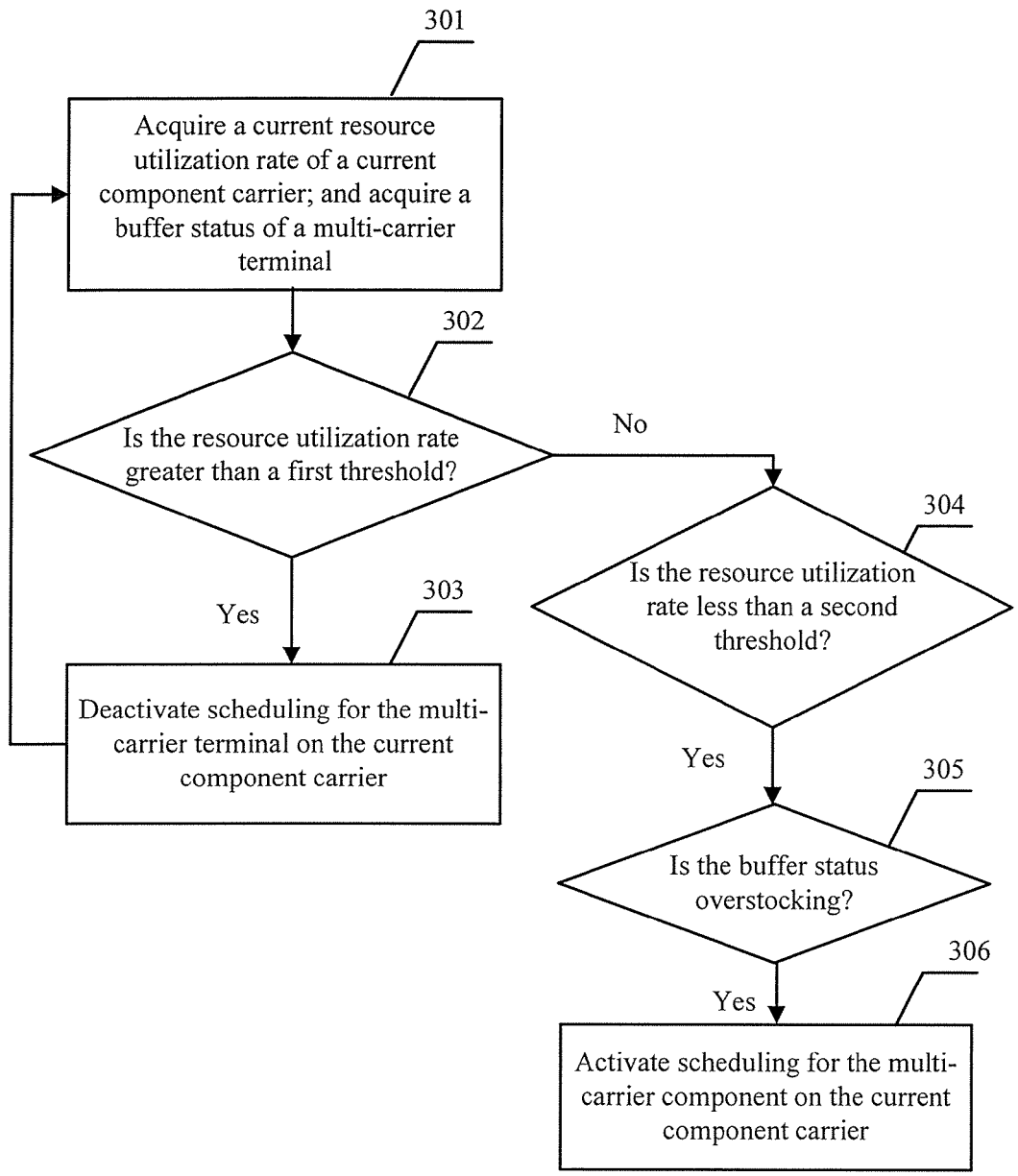
FIG. 3 is a schematic flowchart of a fourth method according to an embodiment of the present invention.

In addition, in the solution that uses formula 1 as a basis for data scheduling, the following problem may exist: An overall scheduling rate of a wireless communications system may not increase all the time. This is because a multi-carrier terminal uses multiple component carriers, and the multiple component carriers include one PCC (Primary Component Carrier, primary component carrier) and at least one SCC (Secondary Component Carrier, secondary component carrier). Returning to formula 1 in the foregoing embodiment, it is assumed that CC1 is a primary component carrier and CC2 to CCi are secondary component carriers. If the multi-carrier terminal attempts to preempt a resource on the secondary component carriers from another non-multi-carrier terminal when there is only a few of or even no idle data channel resource on the secondary component carriers, the attempt may fail and become nothing more than a waste of control channel resources, thereby degrading overall performance of the wireless communications system. To address the technical problem, this embodiment of the present invention further provides the following technical solution, where the solution may be executed in parallel with the solution corresponding to FIG. 2. Referring to FIG. 3, the solution includes:

301: Acquire a current resource utilization rate of a current component carrier; and acquire a buffer status of a multi-carrier terminal.

302: Determine whether the current resource utilization rate of the current component carrier is greater than a first threshold. If yes, go to step 303; otherwise, go to step 304.

The first threshold is used to determine the likelihood that the component carrier has no physical resource available for allocation to the multi-carrier terminal. If the threshold is set to a large value, the CA SCC terminal has a greater chance to obtain a physical resource. If the threshold is set to a smaller value, physical resource demands of a CA PCC terminal and a non-multi-carrier terminal can be better met. A specific value set for the threshold is not limited in this embodiment of the present invention.

303: Deactivate scheduling for the first terminal on the current component carrier; and go to step 301.

This step can prevent a performance loss brought by the multi-carrier terminal when a resource utilization rate of the entire network is quite high, thereby increasing the overall performance of the entire wireless communications network.

304: Determine whether a current resource utilization rate of the current component carrier is less than a second threshold; if yes, go to step 305.

The second threshold is used to determine when a CA SCC terminal can be allocated a physical resource. If the threshold is set to a large value, it is favorable for the CA SCC terminal to be allocated a physical resource. If the threshold is set to a smaller value, physical resource demands of a CA PCC terminal and a non-multi-carrier terminal can be better met. A specific value set for the second threshold is not limited in this embodiment of the present invention.

305: Determine whether the buffer status of the terminal is overstocking; if yes, go to step 306.

306: Activate scheduling for the multi-carrier component on the current component carrier.

Scheduling for a multi-carrier terminal on its secondary component carrier can be reactivated in this step when sufficient resources are available on the first component carrier and the multi-carrier terminal has a large amount of data to send. In this way, the multi-carrier terminal can obtain more physical resources when sufficient physical resources of component carriers are available.

Figure 4:
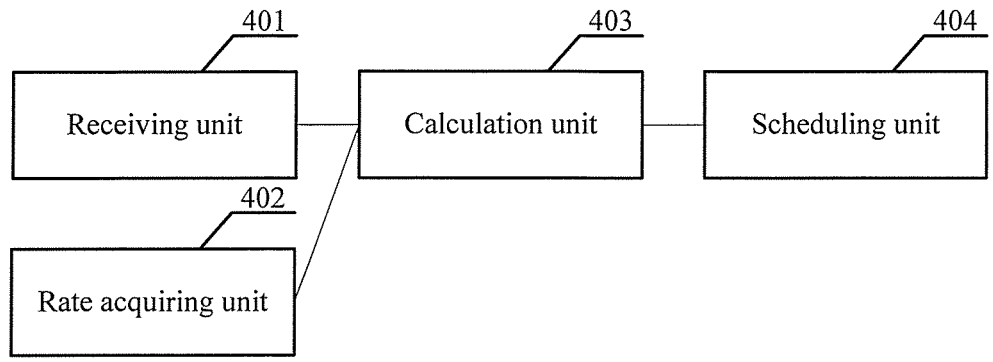
FIG. 4 is a schematic structural diagram of a first device according to an embodiment of the present invention.

An embodiment of the present invention further provides a data scheduling device, where the device may be any device that allocates a physical resource of a component carrier in a multi-carrier technology. For example, it may be an eNB in LTE, an RNC in WCDMA. It should be understood that many types of devices are capable of allocating a physical resource of a component carrier in a multi-carrier technology, and it is impossible to list all of them in an exhaustive fashion; therefore, the foregoing example should not be construed as a limitation on this embodiment of the present invention. As shown in FIG. 4, the device includes:

a receiving unit 401, configured to receive channel quality information sent by a first terminal, where the first terminal is a terminal for which multiple carriers are activated;

a rate acquiring unit 402, configured to acquire an average scheduling rate of the first terminal on a first component carrier;

a calculation unit 403, configured to calculate a current instantaneous scheduling rate of the first terminal on the first component carrier by using the channel quality information, and calculate a scheduling priority of the first terminal on the first component carrier by using the instantaneous scheduling rate and the average scheduling rate; and a scheduling unit 404, configured to allocate a physical resource of the first component carrier to the first terminal according to a descending order of scheduling priorities of terminals to which a physical resource needs to be allocated, where the terminals to which a physical resource needs to be allocated include the first terminal and a second terminal.

In this solution, on the one hand, a multi-carrier terminal and a non-multi-carrier terminal contend in a fair manner for physical resources on each component carrier; on the other hand, a multi-carrier terminal can use multiple component carriers, and therefore a total amount of physical resources that can be obtained by a multi-carrier terminal can increase stably, indicating that the multi-carrier terminal is obviously advantageous over a non-multi-carrier terminal. In this way, differentiation between terminals is achieved.

In addition, because a scheduling priority of a multi-carrier terminal on each component carrier is separately calculated, a multi-carrier terminal and a non-multi-carrier terminal compete equally for a physical resource on each component carrier. That is to say, during contention for resources on a single component carrier, fairness can still be adequately achieved between a multi-carrier terminal and a non-multi-carrier terminal.

Figure 5:
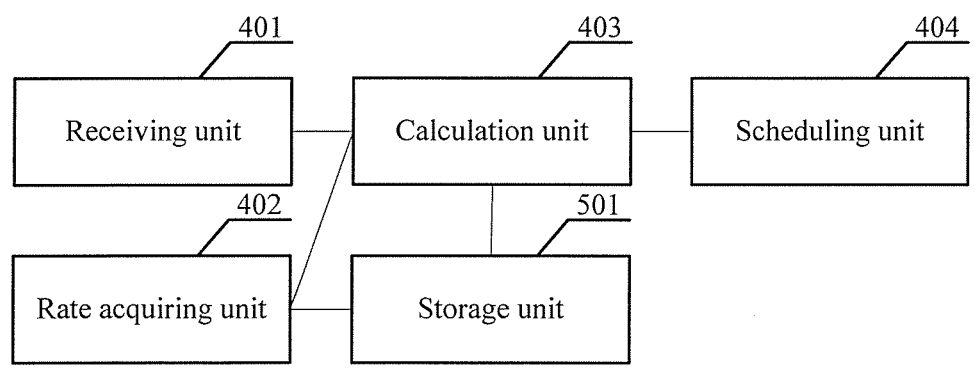
FIG. 5 is a schematic structural diagram of a second device according to an embodiment of the present invention.

Further, as shown in FIG. 5, the calculation unit 403 is further configured to calculate an average scheduling rate of the first terminal on the first component carrier after a physical resource of the first component carrier is allocated to the first terminal; and the device further includes: a storage unit 501, configured to store the average scheduling rate obtained by the calculation unit 403 through calculation.

Figure 6:
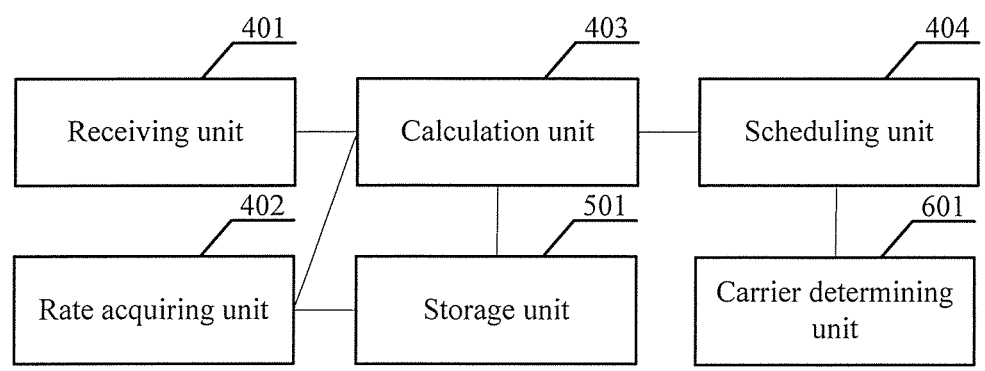
FIG. 6 is a schematic structural diagram of a third device according to an embodiment of the present invention.

Further, as shown in FIG. 6, the device further includes:

a carrier determining unit 601, configured to determine that the first component carrier is a primary component carrier or a secondary component carrier of the first terminal, where the scheduling unit 404 is specifically configured to: if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocate a physical resource of the first component carrier to the first terminal; or if the first component carrier is a primary component carrier of the first terminal and the first component carrier is a secondary component carrier of the second terminal, after allocating a physical resource of the first component carrier to the first terminal, allocate a physical resource of the first component carrier to the second terminal.

More specifically, the scheduling unit 404 is specifically configured to: if the first component carrier is a primary component carrier of the first terminal, add the first terminal to a first queue, or if the first component carrier is a secondary component carrier of the first terminal, add the first terminal to a second queue; and if the first component carrier is a primary component carrier of the second terminal or the second terminal is a non-multi-carrier terminal, add the second terminal to the first queue, or if the first component carrier is a secondary component carrier of the second terminal, add the second terminal to the second queue; and first allocate a physical resource of the first component carrier according to a descending order of scheduling priorities of terminals in the first queue, and then allocate a physical resource of the first component carrier according to a descending order of scheduling priorities of terminals in the second queue.

Figure 7:
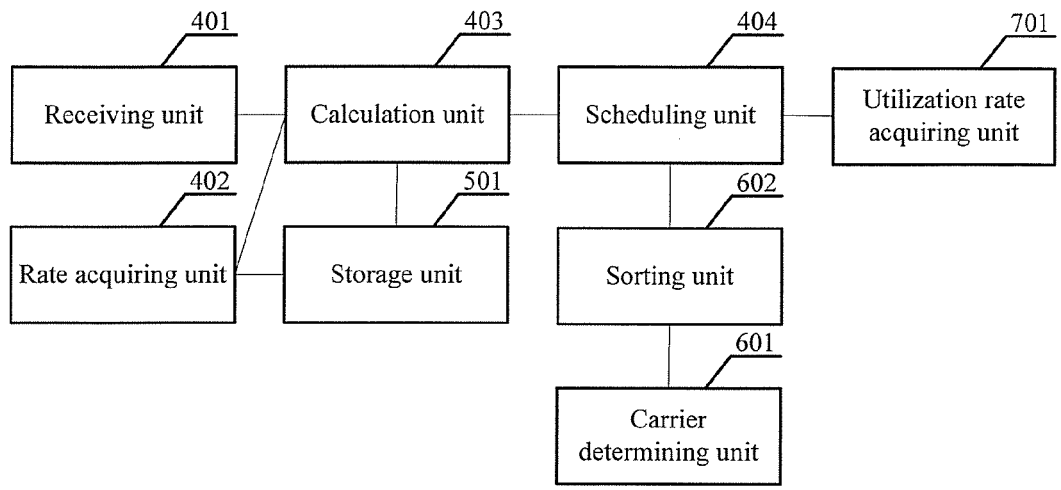
FIG. 7 is a schematic structural diagram of a fourth device according to an embodiment of the present invention.

Further, as shown in FIG. 7, the device further includes:

a utilization rate acquiring unit 701, configured to acquire a current resource utilization rate of the first component carrier after the channel quality information sent by the first terminal is received, where the scheduling unit 404 is further configured to: if the current resource utilization rate of the component carrier is greater than a first threshold, deactivate scheduling for the first terminal on the first component carrier.

Figure 8:
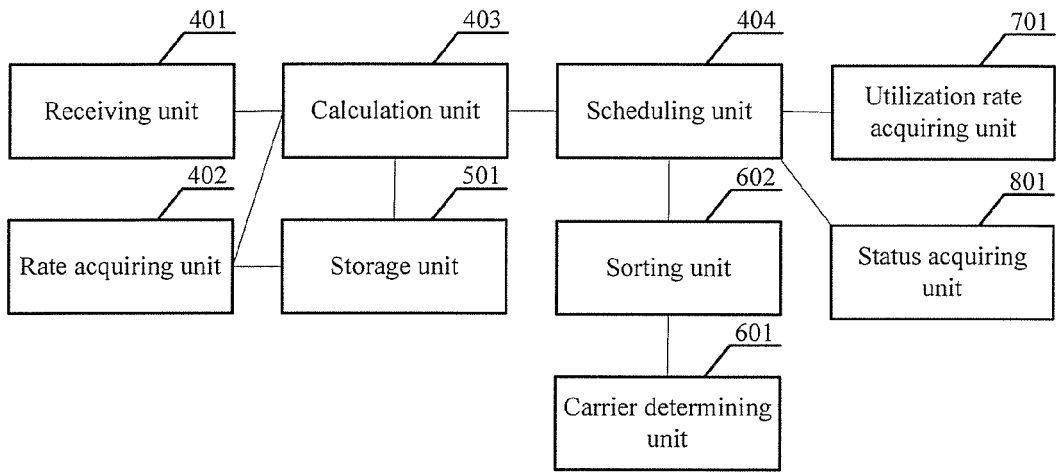
FIG. 8 is a schematic structural diagram of a fifth device according to an embodiment of the present invention.

Further, as shown in FIG. 8, the device further includes:

a status acquiring unit 801, configured to: after scheduling for the first multi-carrier terminal on the first component carrier is deactivated, acquire a buffer status of the first terminal, where the scheduling unit 404 is further configured to: if the current resource utilization rate of the first component carrier is less than a second threshold and the buffer status of the first terminal is overstocking, activate scheduling for the first terminal on the first component carrier, where the second threshold is less than the first threshold.

Figure 9:
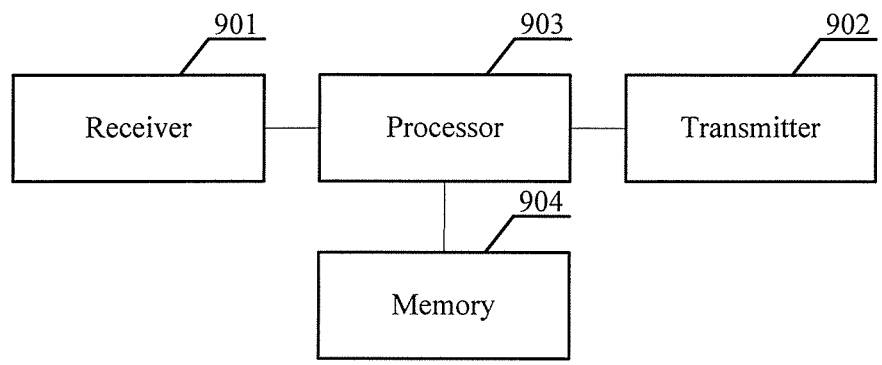
FIG. 9 is a schematic structural diagram of a sixth device according to an embodiment of the present invention.

An embodiment of the present invention further provides a data scheduling device, where the device may be any device that allocates a physical resource of a component carrier in a multi-carrier technology. For example, it may be an eNB in LTE, an RNC in WCDMA. It should be understood that many types of devices are capable of allocating a physical resource of a component carrier in a multi-carrier technology, and it is impossible to list all of them in an exhaustive fashion; therefore, the foregoing example should not be construed as as a limitation on this embodiment of the present invention. As shown in FIG. 9, the device includes: a receiver 901, a transmitter 902, a processor 903, and a memory 904, where:

the receiver 901 is configured to receive channel quality information sent by a first terminal, where the first terminal is a terminal for which multiple carriers are activated; and the processor 903 is configured to: calculate a current instantaneous scheduling rate of the first terminal on a first component carrier by using the channel quality information; acquire an average scheduling rate of the first terminal on the first component carrier; calculate a scheduling priority of the first terminal on the first component carrier by using the instantaneous scheduling rate and the average scheduling rate; and allocate a physical resource of the first component carrier to the first terminal according to a descending order of scheduling priorities of terminals to which a physical resource needs to be allocated, where the terminals to which a physical resource needs to be allocated include the first terminal and a second terminal.

In this solution, on the one hand, a multi-carrier terminal and a non-multi-carrier terminal contend in a fair manner for physical resources on each component carrier; on the other hand, a multi-carrier terminal can use multiple component carriers, and therefore a total amount of physical resources that can be obtained by a multi-carrier terminal can increase stably, indicating that the multi-carrier terminal is obviously advantageous over a non-multi-carrier terminal. In this way, differentiation between terminals is achieved.

In addition, because a scheduling priority of a multi-carrier terminal on each component carrier is separately calculated, a multi-carrier terminal and a non-multi-carrier terminal compete equally for a physical resource on each component carrier. That is to say, during contention for resources on a single component carrier, fairness can still be adequately achieved between a multi-carrier terminal and a non-multi-carrier terminal.

The processor 903 is further configured to: after allocating a physical resource of the first component carrier to the first terminal, calculate and store an average scheduling rate of the first terminal on the first component carrier.

Further, the processor 903 is further configured to determine that the first component carrier is a primary component carrier or a secondary component carrier of the first terminal; and the allocating a physical resource of the first component carrier to the first terminal according to a descending order of scheduling priorities of terminals to which a physical resource needs to be allocated includes:

if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocating a physical resource of the first component carrier to the first terminal; or if the first component carrier is a primary component carrier of the first terminal and the first component carrier is a secondary component carrier of the second terminal, after allocating a physical resource of the first component carrier to the first terminal, allocating a physical resource of the first component carrier to the second terminal.

Further, that the processor 903 is configured to: after determining that the first component carrier is a primary component carrier or a secondary component carrier of the first terminal, if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocate a physical resource of the first component carrier to the first terminal; or if the first component carrier is a primary component carrier of the first terminal and the first component carrier is a secondary component carrier of the second terminal, after allocating a physical resource of the first component carrier to the first terminal, allocate a physical resource of the first component carrier to the second terminal includes that: the processor 903 is specifically configured to: if the first component carrier is a primary component carrier of the first terminal, add the first terminal to a first queue, or if the first component carrier is a secondary component carrier of the first terminal, add the first terminal to a second queue; and if the first component carrier is a primary component carrier of the second terminal or the second terminal is a non-multi-carrier terminal, add the second terminal to the first queue, or if the first component carrier is a secondary component carrier of the second terminal, add the second terminal to the second queue; and first allocate a physical resource of the first component carrier according to a descending order of scheduling priorities of terminals in the first queue, and then allocate a physical resource of the first component carrier according to a descending order of scheduling priorities of terminals in the second queue.

Further, the processor 903 is further configured to: after the channel quality information sent by the first terminal is received, acquire a current resource utilization rate of the first component carrier; and if the current resource utilization rate of the first component carrier is greater than a first threshold, deactivate scheduling for the first multi-carrier terminal on the first component carrier.

Further, the processor 903 is further configured to: after deactivating scheduling for the first multi-carrier terminal on the first component carrier, acquire a buffer status of the first terminal; and if the current resource utilization rate of the first component carrier is less than a second threshold and the buffer status of the first terminal is overstocking, activate scheduling for the first terminal on the first component carrier, where the second threshold is less than the first threshold.

Figure 10:
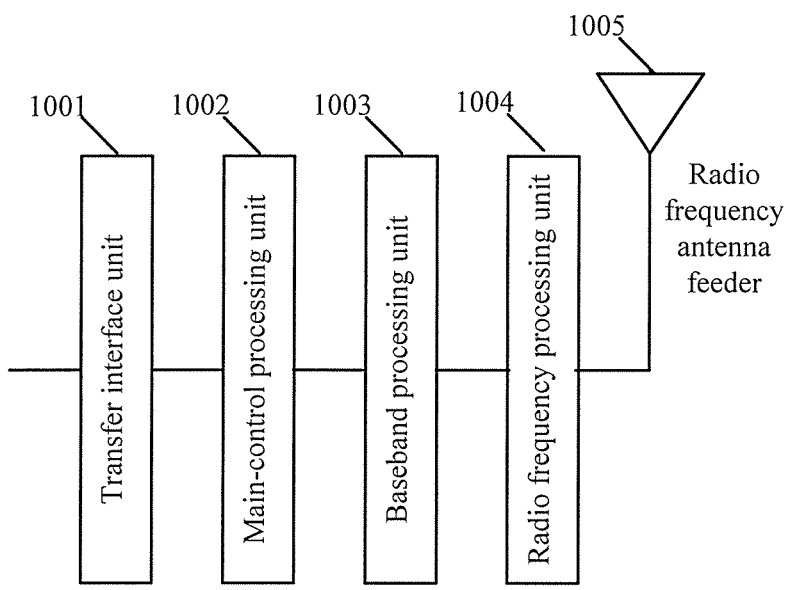
FIG. 10 is a schematic structural diagram of a seventh device according to an embodiment of the present invention.

An embodiment of the present invention provides a base station. As shown in FIG. 10, the base station includes: a transfer interface unit 1001, a main-control processing unit 1002, a baseband processing unit 1003, a radio frequency processing unit 1004, and a radio frequency antenna feeder 1005.

The baseband processing unit 1003 is configured to: receive channel quality information sent by a multi-carrier terminal; calculate a current instantaneous scheduling rate of the multi-carrier terminal on a component carrier by using the channel quality information; acquire an average scheduling rate of the multi-carrier terminal on the first component carrier; calculate a scheduling priority of the multi-carrier terminal on the first component carrier by using the instantaneous scheduling rate and the average scheduling rate; and if two or more terminals need to be allocated a physical resource of the component carrier, allocate a physical resource of the component carrier according to a descending order of scheduling priorities of the terminals.

In this solution, on the one hand, a multi-carrier terminal and a non-multi-carrier terminal contend in a fair manner for physical resources on each component carrier; on the other hand, a multi-carrier terminal can use multiple component carriers, and therefore a total amount of physical resources that can be obtained by a multi-carrier terminal can increase stably, indicating that the multi-carrier terminal is obviously advantageous over a non-multi-carrier terminal. In this way, differentiation between terminals is achieved.

In addition, because a scheduling priority of a multi-carrier terminal on each component carrier is separately calculated, a multi-carrier terminal and a non-multi-carrier terminal compete equally for a physical resource on each component carrier. That is to say, during contention for resources on a single component carrier, fairness can still be adequately achieved between a multi-carrier terminal and a non-multi-carrier terminal.

Further, the baseband processing unit 1003 is further configured to: after a physical resource of the component carrier is allocated according to a descending order of scheduling priorities of the terminals, calculate an average scheduling rate of the terminals on the first component carrier, and store the average scheduling rate obtained through calculation.

Further, the baseband processing unit 1003 is further configured to: determine that the component carrier is a primary component carrier or a secondary component carrier of the multi-carrier terminal; and organize the two or more terminals in descending order according to the scheduling priorities, where:

the baseband processing unit 1003 is specifically configured to: if the component carrier is a primary component carrier of the multi-carrier terminal, add the scheduling priority of the multi-carrier terminal to a first queue, where the first queue includes scheduling priorities of any quantity of non-multi-carrier terminals or a scheduling priority of another multi-carrier terminal; and organize the scheduling priorities in the first queue; or if the component carrier is a secondary component carrier of the multi-carrier terminal, add the scheduling priority of the multi-carrier terminal to a second queue, where the second queue includes scheduling priorities of any quantity of multi-carrier terminals; and organize the scheduling priorities in the second queue; and the allocating a physical resource of the component carrier according to a descending order of scheduling priorities of the terminals includes:

first allocating a physical resource of the component carrier according to a descending order of scheduling priorities of terminals in the first queue, and then allocating a physical resource of the component carrier according to a descending order of scheduling priorities of terminals in the second queue.

Further, the baseband processing unit 1003 is further configured to: after the channel quality information sent by the multi-carrier terminal is received, acquire a current resource utilization rate of the component carrier; and if the current resource utilization rate of the component carrier is greater than a first threshold, deactivate scheduling for the first terminal on the first component carrier.

Further, the baseband processing unit 1003 is further configured to: acquire a buffer status of the multi-carrier terminal; if the current resource utilization rate of the component carrier is less than a second threshold and the buffer status of the terminal is overstocking, activate scheduling for the first terminal on the first component carrier, where the second threshold is less than the first threshold; otherwise, retain a state of scheduling for the first terminal on the first component carrier.

Figure 11:
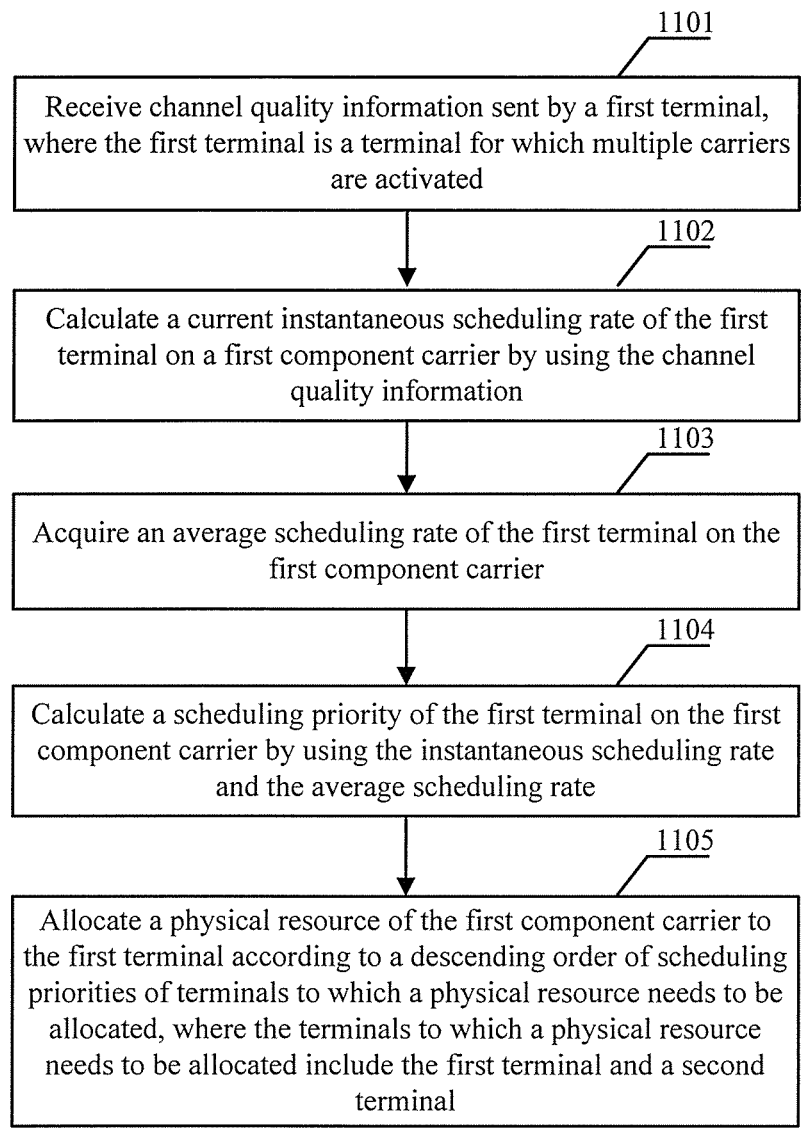
FIG. 11 is a schematic flowchart of a fifth method according to an embodiment of the present invention.

An embodiment of the present invention provides a data scheduling method. As shown in FIG. 11, the method includes:

1101: Receive channel quality information sent by a first terminal, where the first terminal is a terminal for which multiple carriers are activated.

1102: Calculate a current instantaneous scheduling rate of the first terminal on a first component carrier by using the channel quality information.

1103: Acquire an average scheduling rate of the first terminal on the first component carrier.

1104: Calculate a scheduling priority of the first terminal on the first component carrier by using the instantaneous scheduling rate and the average scheduling rate.

1105: Allocate a physical resource of the first component carrier to the first terminal according to a descending order of scheduling priorities of terminals to which a physical resource needs to be allocated, where the terminals to which a physical resource needs to be allocated include the first terminal and a second terminal.

On the one hand, a multi-carrier terminal and a non-multi-carrier terminal contend in a fair manner for physical resources on each component carrier; on the other hand, the first terminal can use multiple component carriers, and therefore a total amount of physical resources that can be obtained by the first terminal can increase stably, indicating that the first terminal is obviously advantageous over a non-multi-carrier terminal. In this way, differentiation between terminals is achieved. In addition, because a scheduling priority of the first terminal on each component carrier is separately calculated, the first terminal and a non-multi-carrier terminal compete equally for a physical resource on each component carrier. That is to say, during contention for resources on a single component carrier, fairness can still be adequately achieved between the first terminal and a non-multi-carrier terminal.

Further, the method further includes:

after allocating a physical resource of the first component carrier to the first terminal, calculating and storing an average scheduling rate of the first terminal on the first component carrier.

Further, the method further includes:

determining that the first component carrier is a primary component carrier or a secondary component carrier of the first terminal; and the allocating a physical resource of the first component carrier to the first terminal according to a descending order of scheduling priorities of terminals to which a physical resource needs to be allocated includes:

if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocating a physical resource of the first component carrier to the first terminal; or if the first component carrier is a primary component carrier of the first terminal and the first component carrier is a secondary component carrier of the second terminal, after allocating a physical resource of the first component carrier to the first terminal, allocating a physical resource of the first component carrier to the second terminal.

Further, the after determining that the first component carrier is a primary component carrier or a secondary component carrier of the first terminal, if the first component carrier is a secondary component carrier of the first terminal, and if the first component carrier is a primary component carrier of the second terminal or the second terminal is a non-multi-carrier terminal, after allocating a physical resource of the first component carrier to the second terminal, allocating a physical resource of the first component carrier to the first terminal; and if the first component carrier is a primary component carrier of the first terminal and the first component carrier is a secondary component carrier of the second terminal, after allocating a physical resource of the first component carrier to the first terminal, allocating a physical resource of the first component carrier to the second terminal includes:

if the first component carrier is a primary component carrier of the first terminal, adding the first terminal to a first queue, or if the first component carrier is a secondary component carrier of the first terminal, adding the first terminal to a second queue; and if the first component carrier is a primary component carrier of the second terminal or the second terminal is a non-multi-carrier terminal, adding the second terminal to the first queue, or if the first component carrier is a secondary component carrier of the second terminal, adding the second terminal to the second queue; and first allocating a physical resource of the first component carrier according to a descending order of scheduling priorities of terminals in the first queue, and then allocating a physical resource of the first component carrier according to a descending order of scheduling priorities of terminals in the second queue.

Further, after the receiving channel quality information sent by a first terminal, the method further includes:

acquiring a current resource utilization rate of the first component carrier; and if the current resource utilization rate of the first component carrier is greater than a first threshold, deactivating scheduling for the first multi-carrier terminal on the first component carrier.

Further, after the deactivating scheduling for the first multi-carrier terminal on the first component carrier, the method further includes: acquiring a buffer status of the first terminal; and if the current resource utilization rate of the first component carrier is less than a second threshold and the buffer status of the first terminal is overstocking, activating scheduling for the first terminal on the first component carrier, where the second threshold is less than the first threshold.

It should be noted that, the foregoing devices are merely divided by logical functions, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A data scheduling method, comprising:

receiving channel quality information sent by a first terminal, wherein the first terminal is a terminal for which multiple carriers are activated;

calculating a current instantaneous scheduling rate of the first terminal on a first component carrier by using the channel quality information;

acquiring an average scheduling rate of the first terminal on the first component carrier;

calculating a scheduling priority of the first terminal on the first component carrier by using the current instantaneous scheduling rate and the average scheduling rate;

allocating a physical resource of the first component carrier to the first terminal according to a descending order of scheduling priorities of terminals to which the physical resource needs to be allocated, wherein the terminals to which the physical resource needs to be allocated comprise the first terminal and a second terminal;

determining that the first component carrier is a primary component carrier or a secondary component carrier of the first terminal; and wherein allocating the physical resource of the first component carrier to the first terminal according to the descending order of scheduling priorities of terminals to which the physical resource needs to be allocated comprises:

when the first component carrier is the secondary component carrier of the first terminal, and when the first component carrier is a primary component carrier of the second terminal or the second terminal is a non-multi-carrier terminal, after allocating the physical resource of the first component carrier to the second terminal, allocating the physical resource of the first component carrier to the first terminal, and when the first component carrier is the primary component carrier of the first terminal and the first component carrier is a secondary component carrier of the second terminal, after allocating the physical resource of the first component carrier to the first terminal, allocating the physical resource of the first component carrier to the second terminal.

2. The method according to claim 1, further comprising:
after allocating the physical resource of the first component carrier to the first terminal, calculating and storing the average scheduling rate of the first terminal on the first component carrier.

3. The method according to claim 1, wherein:
when the first component carrier is the primary component carrier of the first terminal, adding the first terminal to a first queue, and when the first component carrier is the secondary component carrier of the first terminal, adding the first terminal to a second queue;
when the first component carrier is the primary component carrier of the second terminal or the second terminal is the non-multi-carrier terminal, adding the second terminal to the first queue, and when the first component carrier is the secondary component carrier of the second terminal, adding the second terminal to the second queue; and
first allocating the physical resource of the first component carrier according to a descending order of scheduling priorities of terminals in the first queue, and then allocating a physical resource of the first component carrier according to a descending order of scheduling priorities of terminals in the second queue.

4. A data scheduling method, comprising:
receiving channel quality information sent by a first terminal, wherein the first terminal is a terminal for which multiple carriers are activated;
calculating a current instantaneous scheduling rate of the first terminal on a first component carrier by using the channel quality information;
acquiring an average scheduling rate of the first terminal on the first component carrier;
calculating a scheduling priority of the first terminal on the first component carrier by using the current instantaneous scheduling rate and the average scheduling rate;
allocating a physical resource of the first component carrier to the first terminal according to a descending order of scheduling priorities of terminals to which the physical resource needs to be allocated, wherein the terminals to which the physical resource needs to be allocated comprise the first terminal and a second terminal;
wherein after receiving channel quality information sent by the first terminal, the method further comprises:
acquiring a current resource utilization rate of the first component carrier; and
when the current resource utilization rate of the first component carrier is greater than a first threshold, deactivating scheduling for the first terminal on the first component carrier.

5. The method according to claim 4, wherein after deactivating scheduling for the first terminal on the first component carrier, the method further comprises:
acquiring a buffer status of the first terminal; and
when the current resource utilization rate of the first component carrier is less than a second threshold and the buffer status of the first terminal is overstocking, activating scheduling for the first terminal on the first component carrier, wherein the second threshold is less than the first threshold.

6. A data scheduling device, comprising:
a receiving unit, configured to receive channel quality information sent by a first terminal, wherein the first terminal is a terminal for which multiple carriers are activated;
a rate acquiring unit, configured to acquire an average scheduling rate of the first terminal on a first component carrier;
a calculation unit, configured to calculate a current instantaneous scheduling rate of the first terminal on the first component carrier by using the channel quality information, and calculate a scheduling priority of the first terminal on the first component carrier by using the current instantaneous scheduling rate and the average scheduling rate;
a scheduling unit, configured to allocate a physical resource of the first component carrier to the first terminal according to a descending order of scheduling priorities of terminals to which the physical resource needs to be allocated, wherein the terminals to which the physical resource needs to be allocated comprise the first terminal and a second terminal;
a carrier determining unit, configured to determine that the first component carrier is a primary component carrier or a secondary component carrier of the first terminal; and
wherein the scheduling unit is configured to:
when the first component carrier is the secondary component carrier of the first terminal, and when the first component carrier is a primary component carrier of the second terminal or the second terminal is a non-multi-carrier terminal, after allocating the physical resource of the first component carrier to the second terminal, allocate the physical resource of the first component carrier to the first terminal, and
when the first component carrier is the primary component carrier of the first terminal and the first component carrier is a secondary component carrier of the second terminal, after allocating the physical resource of the first component carrier to the first terminal, allocate the physical resource of the first component carrier to the second terminal.

7. The device according to claim 6, wherein:
the calculation unit is further configured to calculate the average scheduling rate of the first terminal on the first component carrier after the physical resource of the first component carrier is allocated to the first terminal; and
the device further comprises:
a storage unit, configured to store the average scheduling rate obtained through calculation.

8. The device according to claim 6, wherein the scheduling unit is configured to:
when the first component carrier is the primary component carrier of the first terminal, add the first terminal to a first queue, and when the first component carrier is the secondary component carrier of the first terminal, add the first terminal to a second queue;

when the first component carrier is the primary component carrier of the second terminal or the second terminal is the non-multi-carrier terminal, add the second terminal to the first queue, and when the first component carrier is the secondary component carrier of the second terminal, add the second terminal to the second queue; and first allocate the physical resource of the first component carrier according to a descending order of scheduling priorities of terminals in the first queue, and then allocate the physical resource of the first component carrier according to a descending order of scheduling priorities of terminals in the second queue.

9. A data scheduling device, comprising:

a receiving unit, configured to receive channel quality information sent by a first terminal, wherein the first terminal is a terminal for which multiple carriers are activated;

a rate acquiring unit, configured to acquire an average scheduling rate of the first terminal on a first component carrier;

a calculation unit, configured to calculate a current instantaneous scheduling rate of the first terminal on the first component carrier by using the channel quality information, and calculate a scheduling priority of the first terminal on the first component carrier by using the current instantaneous scheduling rate and the average scheduling rate; and a scheduling unit, configured to allocate a physical resource of the first component carrier to the first terminal according to a descending order of scheduling priorities of terminals to which the physical resource needs to be allocated, wherein the terminals to which the physical resource needs to be allocated comprise the first terminal and a second terminal;

a utilization rate acquiring unit, configured to acquire a current resource utilization rate of the first component carrier after the channel quality information sent by the first terminal is received; and wherein the scheduling unit is further configured to:

when the current resource utilization rate of the first component carrier is greater than a first threshold, deactivate scheduling for the first terminal on the first component carrier.

10. The device according to claim 9, further comprising:

a status acquiring unit, configured to:

after scheduling for the first terminal on the first component carrier is deactivated, acquire a buffer status of the first terminal; and wherein the scheduling unit is further configured to:

when the current resource utilization rate of the first component carrier is less than a second threshold and the buffer status of the first terminal is overstocking, activate scheduling for the first terminal on the first component carrier, wherein the second threshold is less than the first threshold.

11. A data scheduling device, comprising:

a receiver configured to receive channel quality information sent by a first terminal, wherein the first terminal is a terminal for which multiple carriers are activated; and a processor configured to:

calculate a current instantaneous scheduling rate of the first terminal on a first component carrier by using the channel quality information, acquire an average scheduling rate of the first terminal on the first component carrier, calculate a scheduling priority of the first terminal on the first component carrier by using the current instantaneous scheduling rate and the average scheduling rate, allocate a physical resource of the first component carrier to the first terminal according to a descending order of scheduling priorities of terminals to which the physical resource needs to be allocated, wherein the terminals to which the physical resource needs to be allocated comprise the first terminal and a second terminal, determine that the first component carrier is a primary component carrier or a secondary component carrier of the first terminal, when the first component carrier is the secondary component carrier of the first terminal, and when the first component carrier is a primary component carrier of the second terminal or the second terminal is a non-multi-carrier terminal, after allocating the physical resource of the first component carrier to the second terminal, allocate the physical resource of the first component carrier to the first terminal; and when the first component carrier is the primary component carrier of the first terminal and the first component carrier is a secondary component carrier of the second terminal, after allocating the physical resource of the first component carrier to the first terminal, allocate the physical resource of the first component carrier to the second terminal.

12. The device according to claim 11, wherein the processor is further configured to:

after allocating the physical resource of the first component carrier to the first terminal, calculate and store the average scheduling rate of the first terminal on the first component carrier.

13. The device according to claim 11, wherein the processor is configured to:

when the first component carrier is the primary component carrier of the first terminal, add the first terminal to a first queue, and when the first component carrier is the secondary component carrier of the first terminal, add the first terminal to a second queue;

when the first component carrier is the primary component carrier of the second terminal or the second terminal is the non-multi-carrier terminal, add the second terminal to the first queue, and when the first component carrier is a secondary component carrier of the second terminal, add the second terminal to the second queue; and first allocate the physical resource of the first component carrier according to a descending order of scheduling priorities of terminals in the first queue, and then allocate a physical resource of the first component carrier according to a descending order of scheduling priorities of terminals in the second queue.

14. A data scheduling device, comprising:

a receiver configured to receive channel quality information sent by a first terminal, wherein the first terminal is a terminal for which multiple carriers are activated; and a processor configured to:

calculate a current instantaneous scheduling rate of the first terminal on a first component carrier by using the channel quality information, acquire an average scheduling rate of the first terminal on the first component carrier, calculate a scheduling priority of the first terminal on the first component carrier by using the current instantaneous scheduling rate and the average scheduling rate, allocate a physical resource of the first component carrier to the first terminal according to a descending order of scheduling priorities of terminals to which the physical resource needs to be allocated, wherein the terminals to which the physical resource needs to be allocated comprise the first terminal and a second terminal, after the channel quality information sent by the first terminal is received, acquire a current resource utilization rate of the first component carrier, and when the current resource utilization rate of the first component carrier is greater than a first threshold, deactivate scheduling for the first multi-carrier terminal on the first component carrier.

15. The device according to claim 11, wherein the processor is further configured to:

after deactivating scheduling for the first multi-carrier terminal on the first component carrier, acquire a buffer status of the first terminal; and when the current resource utilization rate of the first component carrier is less than a second threshold and the buffer status of the first terminal is overstocking, activate scheduling for the first terminal on the first component carrier, wherein the second threshold is less than the first threshold.

* * * * *